Nov. 3, 1964
C. L. BURFORD
3,155,848
RANDOM TIME INTERVAL GENERATOR
Filed May 16, 1962
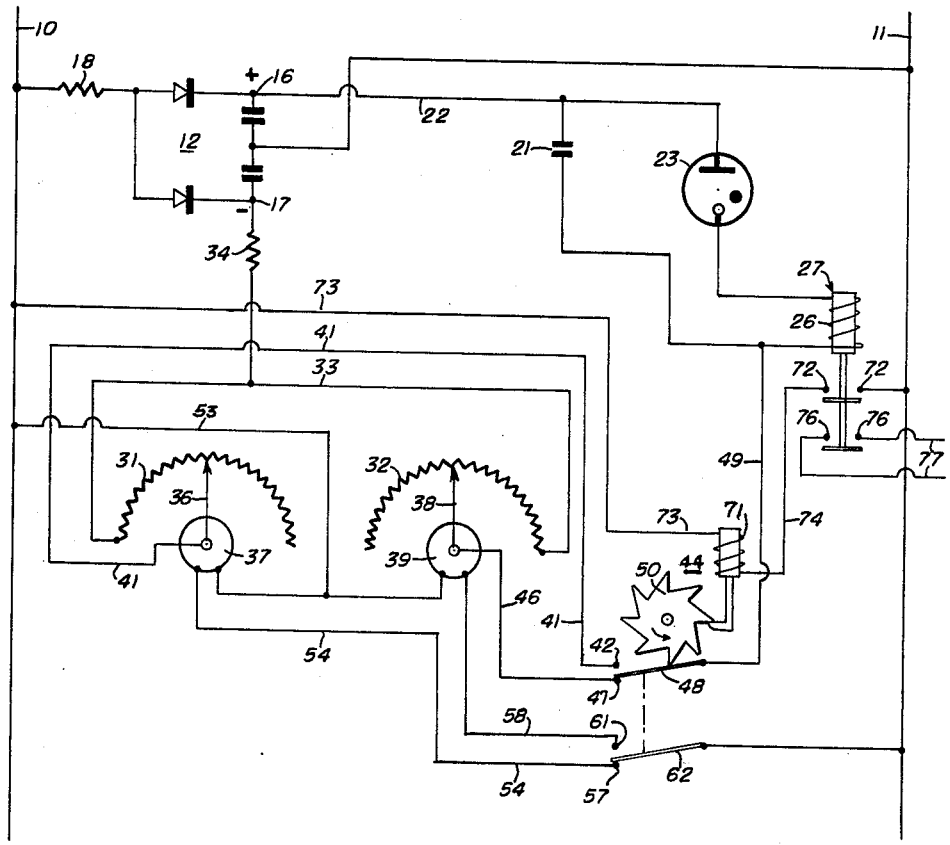
INVENTOR
*CHARLES L. BURFORD*
BY
ATTORNEY

3,155,848
RANDOM TIME INTERVAL GENERATOR
Charles L. Burford, 233 S. Duncan, Stillwater, Okla.
Filed May 16, 1962, Ser. No. 195,262
5 Claims. (Cl. 307—106)

The present invention relates to a system for developing electrical pulses in random order or at various time intervals and the invention more specifically pertains to electrical apparatus wherein means operably responsive to a predetermined voltage across a condenser being charged serves to trigger the discharge of the condenser to provide a pulse which may be employed to control a utilization circuit and apparatus includes means initiating another cycle of charging the condenser at a voltage which differs from that of the preceding charging cycle to vary the rate at which the condenser is charged during each cycle and thereby provide variations in the intervals between the discharge pulses.

It is an object of the invention to provide a system for developing an electrical pulse furnished by energy stored in a condenser including means for varying the potential of the electrical supply which is employed in the next cycle for charging the condenser while the system is in the discharge cycle to provide pulses at varying intervals for actuating means such as a relay in a utilization circuit to thereby provide a random time interval pulse generating system which may be employed in various applications such as triggering the operation of a camera or other equipment.

A more detailed object of the invention is to provide at least two variable resistors in association with a power supply together with means for varying the value of one of the resistors while the other serves as an element in the circuit for charging a condenser including a voltage sensing device for triggering the discharge of the condenser with means associated with the triggering device for initiating changes in the value of the other resistor to thereby provide a different voltage which is applied across the condenser during the next charging cycle.

Other objects and features of the invention will be appreciated and become apparent to those skilled in the art as the present disclosure proceeds and upon consideration of the following detailed description taken in conjunction with the accompanying drawing wherein an embodiment of the invention is disclosed.

The drawing is a schematic circuit diagram illustrating the components and circuitry providing a random time interval electrical pulse generator.

An embodiment of the invention is represented in the drawing wherein an alternating current supply source is indicated at 10 and 11. Any desired rectifying unit such as represented at 12 is connected across the supply lines 10 and 11 for producing full wave rectification of the alternating current source and to provide a positive terminal at 16 and a negative terminal at 17. A fusible resistor 18 may be provided for protecting the unit 12 and the system. A condenser 21 is connected to the positive terminal 16 through a conductor 22. A voltage sensing device which may take the form of a gas filled tube 23 is also connected to the positive terminal 16 through the conductor 22. The condenser 21 and the tube 23 are connected in parallel through a coil 26 of a relay 27.

A feature of the apparatus for producing electrical pulses at varying time intervals includes two sources of unidirectional current that have or may be adjusted to have different voltage levels. In one embodiment of the invention such sources are provided by the unit 12 and two variable resistors 31 and 32 connected by a conductor 33 through a limiting resistor 34 to the negative terminal 17 of the power unit 12. An adjustable tap in the form of a wiper arm 36 is arranged to be moved along the resistor 31. A synchronous or subsynchronous motor 37 is provided for moving the arm 36. A similar wiper arm 38 is provided for varying the value of the resistor 32. A synchronous or subsynchronous motor 39 is provided for moving the wiper arm 38. A conductor 41 extends from the wiper arm 36 to a contact 42 of a memory relay diagrammatically represented at 44 which may be of any suitable type. A conductor 46 extends from the wiper arm 38 to another contact 47 of the relay 44. A switch blade 48 of the relay 44 normally engages the contact 42 but is moved to engage the contact 47 by a tooth or cam projection of the ratchet mechanism 50 of the relay. A conductor 49 connects the switch blade 48 to the condenser 21 and the relay coil 26. Thus when the elements are in the position shown in the drawing the condenser 21 is charged with the circuit extending through the conductor 33, the resistor 32, the wiper arm 38, conductor 46, switch blade 48, the conductor 49, the condenser 21 and the conductor 22. The rate of charging depends upon the voltage across the condenser terminals and this voltage is determined by the position of the wiper arm 38 on the resistor 32.

One terminal of the motor 37 and one terminal of the motor 39 are connected to one side 10 of the supply line through a conductor 53. A conductor 54 extends from the other terminal of the motor 37 to a contact 57 of the relay 44. A conductor 58 extends from the second terminal of the motor 39 to a contact 61 of the relay 44. A switch blade 62 of the relay 44 normally engages the contact 61 but this blade is moved to the position shown in the drawing and engages the contact 57 by the ratchet mechanism 50 of the relay 44. When the blade 62 engages the contact 57 a circuit is closed with extends from the side 10 of the supply source through the conductor 53 the winding of the motor 37, the conductor 54, the switch blade 62 to the other side 11 of the line. The motor 37 is thus energized and rotates to swing the wiper arm 36 and vary the value of the resistor 31. When the switch blade 62 of the relay 44 is in its other and normal postion the circuit to the motor 37 is interrupted and a circuit is completed through winding of the motor 39 to vary the value of resistor 32. The coil 71 of the relay 44 is energized when the contacts 72 of the relay 27 are closed. This circuit includes a conductor 73 extending from the side 10 of the supply line through the coil 71, a conductor 74 and the contacts 72 to the other side 11 of the line.

Contacts 76 and conductors 77 form one type of utilization circuit which is rendered operative when the coil 26 of the relay 27 is energized. The utilization circuit may serve to actuate the shutter of a camera or to initiate any other desired operation.

In operation and when the components are in the positions shown in the drawing and assuming that a charging cycle is under way a voltage is applied across the condenser 21 at a value as provided by the position of the adjustable tap 38 on the resistor 32. The charging of the condenser 21 continues at a rate as provided by the voltage applied across the condenser and this voltage is fixed by the position of the wiper arm 38 on the resistor 32. When the terminal voltage of the condenser attains a predetermined value as provided by the breakdown voltage of the tube 23 the condenser discharges. The discharge current flows through the tube 23 and the coil 26 of the relay 27. This energy is sufficient to actuate the relay 27 to close the contacts 72 and to close the contacts 76 of the utilization circuit 77. The energy remaining in the condenser is then insufficient to maintain the tube 23 in the conductive state.

The closure of the contacts 72 energizes the coil 71 of the relay 44 which is operated to actuate the ratchet mechanism 50 and the switch blade 48 disengages the contact 47 and engages the contact 42. The switch blade 62 also moves from the contact 57 into engagement with the contact 61. This serves to deenergize the motor 37 and to energize and start the motor 39. Swinging movement of the wiper arm 36 ceases and remains in that position on the resistor 31. Another cycle of charging the condenser then takes place through a circuit extending from the negative terminal 17 of the power unit, the conductor 33, the resistor 31, the conductor 41, the contact 42 of the relay 44, the blade 48 and the conductor 49. The value of the resistor 31 is at a random fixed value and the voltage applied across the condenser differs from that applied during the preceding charging cycle so that the time required to charge the condenser 21 to the breakdown voltage of the tube 23 differs from that of the preceding charging cycle. Accordingly there are random time intervals between the electrical pulses which serve to actuate the relay 27.

While the invention has been described with reference to particular elements and components in association with a specific system it will be appreciated that changes may be made in the elements as well as the circuits. The tube 23 may have any desired breakdown level so as to alter the time interval required for charging the condenser at a particular voltage. The resistors and condenser may have any desired characteristics. Such changes and others may be made without departing from the spirit and scope of the invention as set forth in the appended claims.

What I claim and desire to secure by Letters Patent is:

1. A system for producing electrical pulses at random intervals comprising, a source of unidirectional current, a condenser connected to one side of said source, a first voltage varying means, a second voltage varying means, means for connecting the other side of said source through the first voltage varying means to the other side of said condenser to provide a charging cycle, means operable during said charging cycle for actuating the second voltage varying means, a circuit connected to said condenser and means therein operably responsive to a predetermined voltage across said condenser for triggering discharge of said condenser, means responsive to said discharge for actuating the first voltage varying means and interrupting actuation of the second voltage varying means, means operably responsive to said discharge for connecting the other side of said source to said condenser through the second voltage varying means to initiate another charging cycle, and means operable upon the discharge of the condenser for activating a utilization circuit.

2. A system for producing electrical pulses at random intervals according to claim 1 wherein the actuation of each voltage varying means is controlled by a memory type relay.

3. A system for producing electrical pulses at varying intervals comprising, a source of unidirectional current having a substantially fixed voltage, a condenser connected to one side of said source, a first variable resistor, a second variable resistor, means for connecting the other side of said source through the first resistor to the other side of said condenser to provide a charging cycle, means operable upon occurrence of said charging cycle for altering the value of the second resistor, a circuit connected to said condenser and means therein operable responsive to a predetermined voltage across said condenser for triggering discharge of said condenser, means operable upon occurrence of said discharge for altering the value of the first resistor, means operably responsive to said discharge for connecting the other side of said source to said condenser through the second resistor to initiate another charging cycle, and means operable upon said discharge for activating a utilization circuit.

4. A system for producing electrical pulses at random intervals comprising, a source of unidirectional current, a condenser connected to one side of said source, a first voltage varying means, a second voltage varying means, means for connecting the other side of said source through the first voltage varying means to the other side of said condenser to provide a charging cycle, means operable during said charging cycle for actuating the second voltage varying means, a relay coil and a circuit and a tube therein operable to discharge said condenser through said relay coil, means responsive to said discharge through the and interrupting actuation of the second voltage varying means, means operably responsive to said discharge through the relay coil for connecting said condenser through the second voltage varying means to the other side of said source to initiate another charging cycle, and means operable upon energization of said relay coil activating a utilization circuit.

5. A system for producing electrical pulses at random intervals according to claim 4 wherein the means responsive to the discharge through said relay coil alternately controls actuation of the voltage varying means and alternate selection of the connection of the condenser through one of the voltage varying means.

References Cited in the file of this patent

UNITED STATES PATENTS

| | | |
|---|---|---|
| 2,614,140 | Kreer | Oct. 14, 1952 |
| 2,614,142 | Edson | Oct. 14, 1952 |
| 2,761,099 | Berry et al. | Aug. 28, 1956 |